Jan. 6, 1931. H. B. PALMER 1,787,758
AUTOMOBILE TRANSMISSION AND IGNITION LOCK
Filed May 1, 1928 3 Sheets-Sheet 1
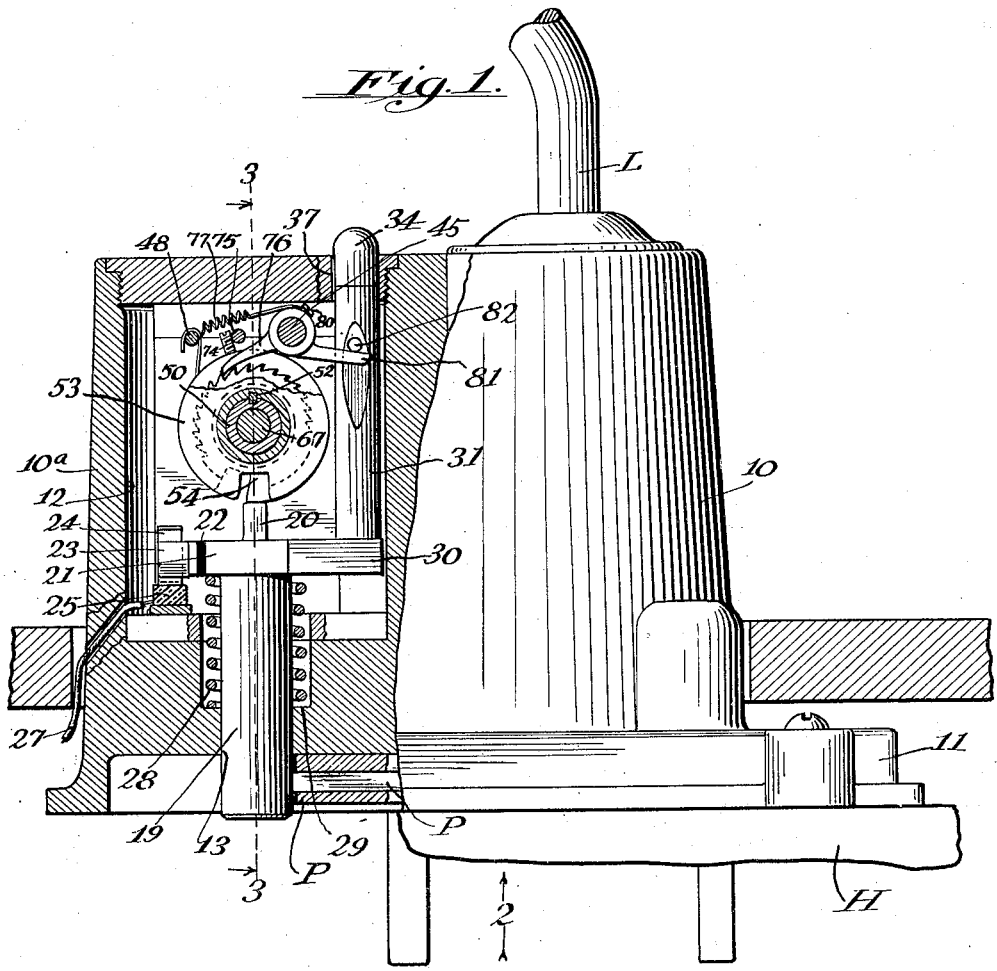
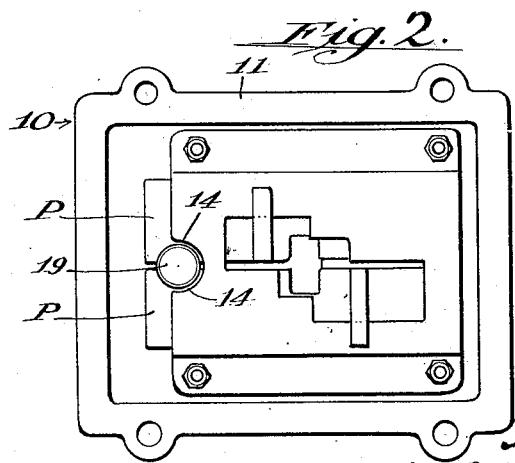
Inventor.
H. B. Palmer.
By Martin P. Smith
Attorney.

Jan. 6, 1931.  H. B. PALMER  1,787,758
AUTOMOBILE TRANSMISSION AND IGNITION LOCK
Filed May 1, 1928  3 Sheets-Sheet 2
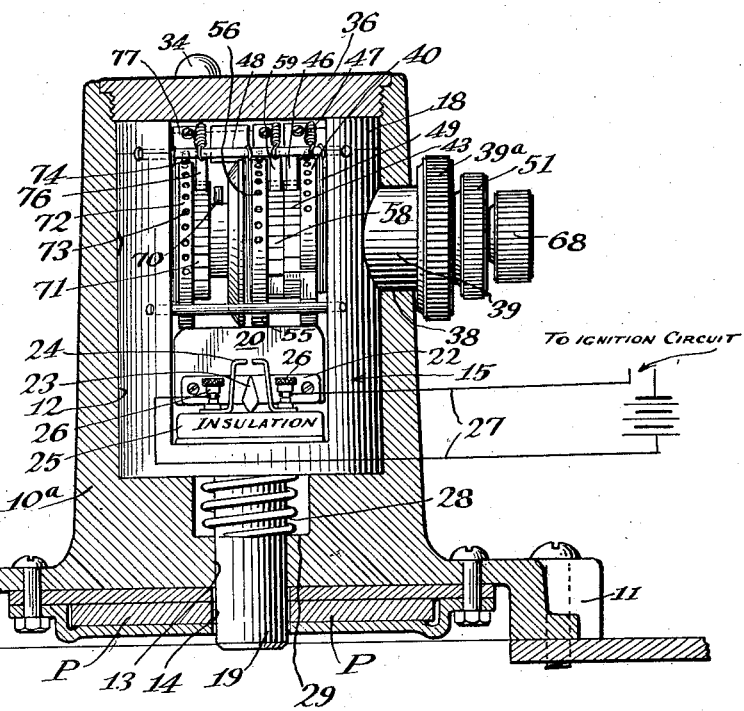
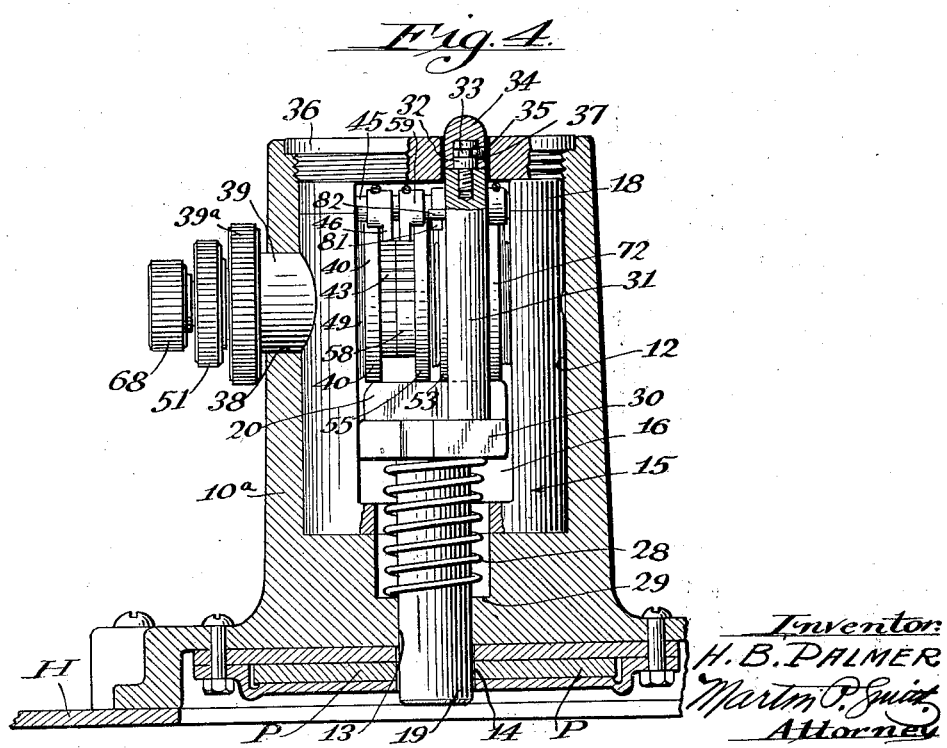

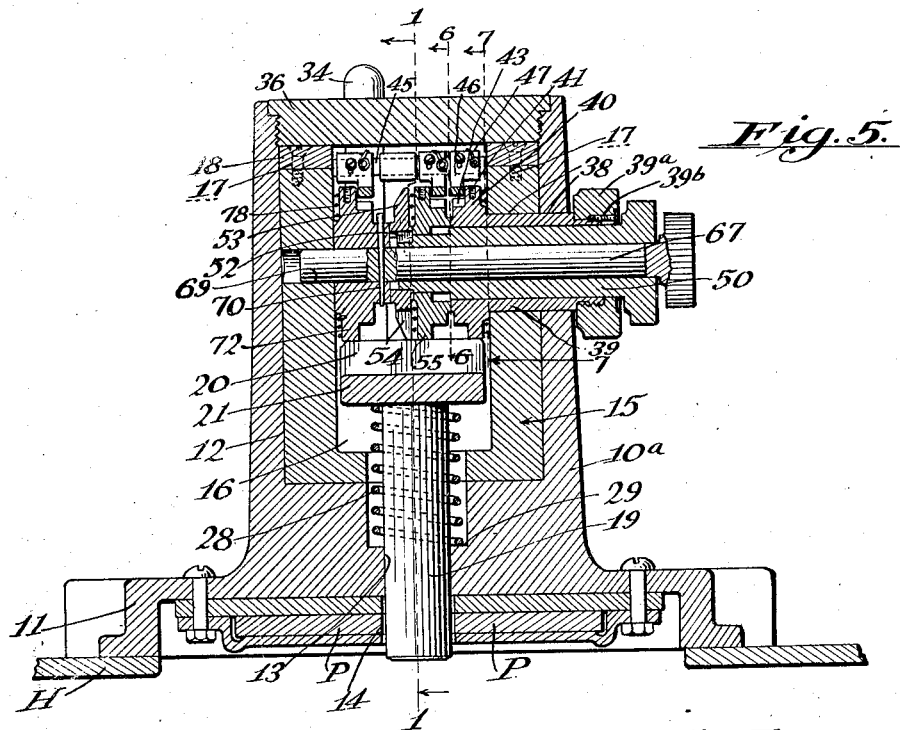
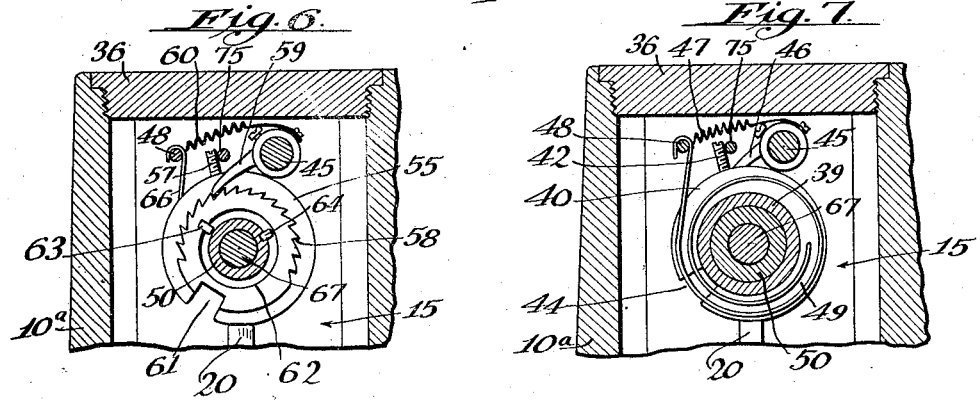
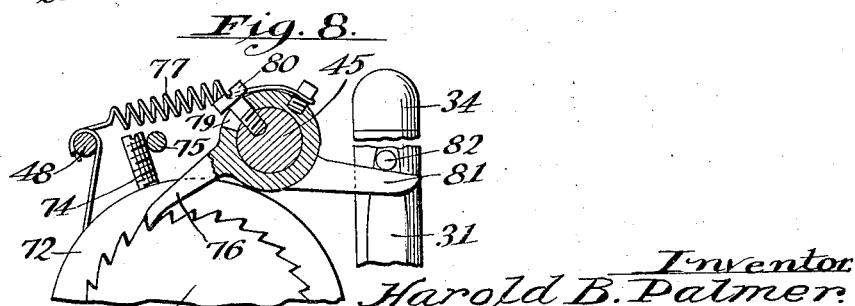

Patented Jan. 6, 1931

1,787,758

UNITED STATES PATENT OFFICE

HAROLD B. PALMER, OF SAN DIEGO, CALIFORNIA

AUTOMOBILE TRANSMISSION AND IGNITION LOCK

Application filed May 1, 1928. Serial No. 274,241.

My invention relates to a combination locking mechanism and more specifically to a lock that is especially designed for positively locking parts of the selective gear transmission of a motor vehicle and at the same time, opening the circuit of the ignition system of the vehicle, thereby effectually preventing the theft or unauthorized use of the vehicle with which the locking mechanism is associated.

Further objects of my invention are, to generally improve upon and simplify the construction of the existing forms of motor vehicle locks, to construct and arrange the parts of the lock so as to make it practically impossible for an unauthorized person to remove any portion of said lock or to solve the combination thereof; further, to provide a locking device of the character referred to wherein the locking bolt can be moved into locking engagement with parts of the selective transmission only while the gear shift lever is in neutral position, and further, to construct the lock so that all parts thereof, with the exception of the discs or knobs that are utilized for setting the combination to release the lock, are locked wholly within a housing that is preferably formed of hard, tough metal that will effectually resist the action of files, hacksaws, cold chisels and the like, that might be used in an attempt to break the lock.

A further object of my invention is to provide a relatively simple, practical and efficient locking mechanism for motor vehicles wherein the parts of the lock are assembled within a metal block that forms the lock housing, the latter being firmly anchored to a part of the vehicle mechanism; for instance, the transmission gear housing, thereby making it practically impossible to remove the lock or such portions thereof as would permit operation of the vehicle.

With the foregoing and other objects in view, my invention consists in certain novel features of construction and arrangement of parts that will hereinafter be more fully described and claimed and illustrated in the accompanying drawing, in which—

Fig. 1 is a side elevational view of the metal block or housing that serves as a support and bearing for the gear shift lever of a motor vehicle with a portion of said block in vertical section, which section is taken approximately on the line 1—1 of section 5.

Fig. 2 is a view looking against the underside of the block or housing in which the lock is located and showing the locking bolt in engagement with the plates of the selective gear transmission that are actuated by the gear shift lever.

Fig. 3 is a vertical, transverse section taken on the line 3—3 of Fig. 1.

Fig. 4 is a vertical, transverse section taken on the same plane as Fig. 3, but looking in the opposite direction.

Fig. 5 is a vertical transverse section taken thru the center of the lock and showing all parts thereof in section.

Fig. 6 is a vertical section taken on the line 6—6 of Fig. 5.

Fig. 7 is a vertical section taken on the line 7—7 of Fig. 5.

Fig. 8 is a detail section of one of the pawls that cooperate with the ratchet wheels forming a part of the lock.

Referring by numerals to the accompanying drawings which illustrate a practical embodiment of my invention, 10 designates a block which may be formed of manganese steel or iron, or other hard, tough metal, and formed integral with the base of said block, is a flange 11 that may be rigidly fixed in any suitable manner to the transmission gear housing H of a motor vehicle. Arranged for operation within a recess in the underside of the block and its base flange, are the sliding plates P that form a part of the usual selective gear transmission, and which plates are actuated by depending portion of the usual gear shift lever L. This gear shift lever is usually provided with a universal bearing in the upper portion of the block or housing 10.

For the accomodation of my improved lock, the block or housing 10 is provided with an integral extension 10—a, and formed therein is a substantially cylindrical recess 12 that is occupied by the greater portion of my improved locking mechanism. Formed thru the lower portion of the block or housing 10, and leading downwardly from the center of the recess 12, is an opening 13 for the accommodation of the lower portion of the locking bolt, and which bolt, when moved downward into locking position, engages in semi-circular notches 14 that are formed in the inner edges of the sliding plates P and which notches align with each other and with the opening 13 when said plates are moved into neutral position by the gear shift lever.

Fitting snugly within the recess 12, is a substantially cylindrical block 15 that serves as a supporting frame for the principal parts of the lock, and formed in said block is a centrally arranged opening 16 that extends to the top of said block, and which terminates a short distance above the bottom of said block.

Removably mounted on top of block 15 to the sides of the opening 16 therein, and retained in position by screws 17, are plates 18 that function as the upper portions of bearings for a plurality of transverse rods that extend across the upper portion of the opening 16 in block 15, and the ends of which rods occupy recesses formed in the upper surface of block 15.

Arranged to move vertically thru opening 13 is a locking bolt 19, the lower portion of which is adapted, when said bolt is moved downward to its limit of movement, to occupy the notches 14 in sliding plates P, and when said locking bolt is elevated, its lower end is withdrawn from the notches in said sliding plates, thereby permitting the latter to be shifted by the gear shift lever.

Formed integral with the upper end of the locking bolt 19 and occupying the lower portion of the opening 16, is a horizontally disposed bar 20, and formed integral with and projecting forwardly from the lower portion of this bar, is a flange 21 on the front face of which is secured a section 22 of suitable insulating material. Secured to and projecting forwardly from this section of insulating material, is a wedge-shaped contact finger 23, which, when the locking bolt is elevated, is adapted to make contact with inturned ends of a pair of contact springs 24, the lower portions of which are secured to a block 25 of insulation that is secured in any suitable manner to block 15 at the lower end of the opening 16 therein. Secured to the lower portions of the contact springs are suitable binding posts 26 and connected thereto, are conductors 27 that form a part of the ignition circuit of the motor vehicle with which the lock is associated.

As a result of the arrangement just described, the ignition circuit is open while the locking bolt is depressed, so as to engage and lock the sliding plates P of the selective gear transmission, and when said locking bolt is elevated to release said plates, the wedge-shaped contact finger 23 passes between the inturned upper ends of the springs 24, and thereby closes the ignition circuit of the vehicle.

Arranged on the upper portion of the locking bolt 19, and bearing against the underside of block 21, is an expansive coil spring 28, the lower portion of which bears upon a shoulder 29 that is formed in the intermediate portion of the opening 13.

Formed integral with and extending rearwardly from block 21, is a lug 30, and formed integral therewith or fixed thereto, is the lower end of a vertically disposed rod 31 that extends upwardly thru the rear portion of opening 16, and seated in the upper end of this rod is the threaded lower portion of a short stem 32 of reduced diameter, and formed in said stem is a circumferential groove 33. Mounted to rotate freely upon the projecting upper portion of the stem 32 is a cap or stud 34 of hardened metal having a rounded upper surface, and said stud is retained for rotary movement upon the stem 32 by a pin or screw 35 that enters the groove 33.

The upper end of the chamber 12 that is occupied by block or frame 15 and the greater portion of the locking mechanism, is closed by a plate 36, the lower portion of which is externally threaded in order that it may be screwed into the internally upper portion of the recess or chamber 12, and when properly seated in the upper portion of chamber 12, the top surface of said plate lies flush with the upper surface of block 10, and the under surface of said plate bears directly on top of the cap plates 18.

Formed thru plate 36, is an aperture 37 which accommodates the upper end of rod 31 and its cap 34, and when rod 31 is moved downward by pressure on the rounded top of cap 34, the retaining screw 35 is positioned wholly below the upper surface of the plate 36 where it is inaccessible to persons attempting to open the lock. When the locking bolt is moved downward into locking position, only the rounded upper end of cap 34 projects above the top surface of plate 36, and owing to the shape of said cap and the fact that it is mounted to rotate freely on the upper end of the rod 31, it is practically impossible for a tool, such as pliers, or wrench to be clamped or engaged on the projecting portion of said cap in an attempt to open the lock.

The length of the cap 34 and the vertical movement of rod 31 are such that when the rod and locking bolt are elevated, the cap or stud is positioned above the upper surface of plate 36, thereby giving access to the screw 35 that retains the cap in position on the rod, and at such time, the locking bolt is disengaged from the plates P. When the locking bolt and rod 31 are moved downward to their limit of movement, the upper end of rod 31 or the joint between said rod and the cap occupies a plane just below the under surface of the plate 36.

The construction just described is essential to the assembly of the parts of the lock and to the removal thereof in the event that it should be necessary for the vehicle owner to remove the operating parts of the lock from the housing.

Formed in the side wall of the housing 10, and in one side of the block or frame 15, are coinciding apertures 38 that are occupied by a sleeve 39, and detachably mounted on the outer end of said sleeve, is a disc or knob 39a having a milled edge, and which is locked to the end of said sleeve by means of a pin or screw 39b that is inserted in the joint between said disc and sleeve.

Formed integral with or fixed to the inner end of sleeve 39, is a disc 40, and formed in the periphery thereof, is a series of threaded apertures 41, and adapted to be removably seated in any one of said apertures, is a radially disposed threaded pin 42.

Formed integral with the inner face of the disc 40 and with the inner end of sleeve 39, is a ratchet wheel 43, and formed in the edge of this ratchet wheel and the disc 40, is a notch 44 that is adapted to receive the bar 20 that is arranged in the upper end of locking bolt 19.

The ends of a transversely disposed rod 45 are seated in bearings in the upper end of frame 15, and retained in said bearings by the cap plates 18, and mounted on this rod is a pawl 46, the point of which engages the teeth of ratchet wheel 43. A small retractile spring 47 is connected at one end to pawl 46 and at the other end, to a small transversely disposed rod 48 that is positioned between the upper end of frame 15 and the plates 18 at a point in front of rod 45, and this spring normally retains the point of the pawl 46 in engagement with the point of ratchet wheel 43. Secured to one of the side faces of disc 40 is one end of a spiral spring 49, the same being wound once or twice around the sleeve 39, and the opposite end of said spring is provided with a hook that engages over the rod 48.

Extending thru sleeve 39 is an inner sleeve 50, and formed integral with, or fixed to the outer end thereof, is a disc or knob 51 having a knurled edge, and said disc or knob being slightly smaller in diameter than the disc or knob 39a.

The inner end of this inner sleeve projects a short distance beyond the inner end of sleeve 39, and secured to said projecting inner end, preferably by means of a key 52, is a disc 53 that is provided in its edge with a notch 54, and which latter is adapted to receive transverse bar 20. Loosely mounted on the projecting inner end of sleeve 50, between the disc 53 and the ratchet wheel 43, is a disc 55 in the periphery of which is formed a series of threaded apertures 56, and adapted to be screw seated in any one of said apertures, is a threaded pin 57. Formed integral with the disc 55 and positioned immediately adjacent to ratchet wheel 43, is a ratchet wheel 58, and adapted to engage the teeth thereof, is the point of a pawl 59 that is mounted on rod 45. A small retractile spring 60 has one end connected to the hub of pawl 59 and the opposite end of said spring is connected to rod 48. Formed in the edges of the disc 55 and ratchet wheel 58, is a notch 61 that is adapted to receive transverse bar 20.

Formed in the face of ratchet wheel 58, adjacent to the face of ratchet wheel 43 is a recess 62, and seated in the ratchet wheel 58 and projecting into this recess, is a key or lug 63. Seated in that portion of the projecting inner end of sleeve 50 that occupies the recess 62 and projecting into said recess, is a key or lug 64 that is adapted, when the sleeve 50 is rotated, to engage the key of lug 63, and thus carry the ratchet wheel 58 and disc 55 with said sleeve when the latter is rotated.

The inner end of a spiral spring 66 is directly connected to disc 55, and the outer end of said spring is hooked over rod 48.

A shaft 67 extends thru and is arranged for rotation in the inner sleeve 50 and the outer end of said shaft carries a disc or knob 68 having a milled edge, and which disc or knob is slightly smaller in diameter than knob 51. The inner end of shaft 67 is journaled in a bearing 69 in the corresponding portion of the block or frame 15. Removably mounted on the inner portion of shaft 67, and retained thereon by means of a pin 70, that passes diametrically thru said shaft, is the hub portion of a ratchet wheel 71, and formed integral with said ratchet wheel, is a disc 72 in the periphery of which is formed a series of threaded apertures 73, any one of which is adapted to receive a threaded pin 74.

The ends of a transversely disposed rod 75 are mounted in the upper portion of the frame 15, below the cap plates 18 between the rods 48 and 45, and which rod 75 serves as a stop, against which the pins 42, 57 and 74 engage to limit the rotary movement in one direction of the discs in which said pins are seated, and the shaft and sleeves that carry said discs. Adapted to engage the teeth of ratchet wheel 71, is the point of a pawl 76, and connected to the hub portion thereof, is the end of a retractile spring 77, the opposite end being formed into a hook that engages rod 48.

One end of a spiral spring 78 is seated in the face of disc 72 and the outer end of said spring is provided with a hook that engages rod 48.

The pawls 46, 59 and 76 are mounted so as to have a limited degree of rotary movement relative to the supporting shaft 45, and this provision is brought about by forming in the hub portions of each pawl, a relatively short slot such as 79 (see Fig. 8) and passing thru each slot is a pin or screw 80 that is seated in the shaft 45. Thus, the shaft 45 and the pawls carried thereby are connected so that they have a limited degree of relative rotary movement. The retractile springs associated with the three pawls normally hold the points thereof in engagement with the respective ratchet wheels, and with the pawls so positioned, the screws or pins 80 are at the rear ends of the slots 79, as illustrated in Fig. 8.

Fixed on shaft 45 in any suitable manner, is the hub portion of a short rearwardly projecting finger 81, and the outer portion of which finger is positioned beneath a pin 82 that projects laterally from the upper portion of rod 31 (see Fig. 1).

When my improved lock is in position to lock the plates P that are controlled by the gear shift lever, the latter is necessarily in neutral position and said plates occupy positions with the notches 14 in registration with each other, and the lower portion of locking bolt 19 is positioned in the notches 14 as illustrated in Figs. 1, 3 and 5. When so positioned, the plunger rod 31 that is connected to the upper end of the locking bolt is moved downwardly into the housing that is occupied by the lock, with only the rounded upper end of the cap 34 projecting above the upper surface of the plate 36.

With the locking bolt thus positioned, the switch finger 23 is positioned below and out of contact with the inturned upper ends of the contact springs 24, and thus the ignition circuit is open. When the bolt 19 is moved downward into locking position, spring 28 is compressed to a certain degree, thereby producing tension in said spring, and the locking bolt and parts associated therewith are effectually held against upward movement by the engagement of the upper edge of the block or bar 20 against the peripheries of the discs 40, 55 and 72, it being understood that the notches in said discs are at this time, out of alignment with each other and out of registration with the bar or block 20. The relative positions of the discs and their notches are controlled by the positions of the screws or pins 42, 57 and 74 in the peripheries of the discs and while the bolt is in locking position, these pins or screws all bear against the cross-rod 75, and, consequently, hold the discs so that the notches therein are out of alignment with each other and out of registration with the bar 20, consequently, said bar and the parts associated therewith cannot move vertically so as to withdraw the lower end of the bolt from engagement with the plates P.

We will assume that the lock is set to be opened by the combination "2—4—6", the "2" representing the number of notches that ratchet wheel 71, carried by shaft 67, must be rotated to bring the notch in disc 72 into position directly above bar 20, the numeral "4" representing the number of teeth on ratchet wheel 58 that must be moved to position disc 55 so that the notch 61 therein is positioned directly above bar 20 and in transverse alignment with the notch in disc 72, and the numeral "6" representing the number of teeth that ratchet wheel 43 carried by the outer sleeve 39, must be moved to bring the notch 44 in disc 40 into position immediately above crossbar 20, and in alignment with the notches in the discs 55 and 72.

Obviously, any other combination of three numerals may be utilized, such combinations being controlled or established by arranging the pins 42, 57 and 74 in different apertures in the edges of the respective discs 40, 55 and 72, and by providing twelve or fifteen of the apertures in each disc, an innumerable number of combinations may be produced.

Under such conditions, the car owner or person knowing the combination engages knob 68 and turns same to rotate shaft 67, and when ratchet wheel 71 that is carried by said shaft travels a distance of six teeth, past the point of pawl 76, and which travel is indicated by the clicking of the pawl past the teeth, the operator is aware that the ratchet wheel and disc 72 have been moved into position so that the notch in said ratchet wheel is positioned directly above bar 20. The operator now engages knob 51 to which disc 53 is fixed, and upon which disc 55 and its ratchet wheel are loosely mounted and rotate said knob and the sleeve 50 until the key or lug 64, that is carried by said sleeve, engages the key or lug 63 that is carried by disc 55, and after said lugs have been engaged, the knob 51 is rotated until four teeth on the ratchet wheel 58 have passed the point of pawl 59, which travel is indicated by the clicks produced by the point of the pawl passing the four teeth, and such movement brings the notch 61 in disc 55 into position directly above bar 20, and in alignment with the notch in the disc 72. When this portion of the combination has been completed, disc 53 is positioned so that its notch 54 is out of alignment with the notches in the discs 55 and 72.

The operator now engages knob 39a and manipulates same so as to rotate the outer sleeve 39 a distance of six notches on ratchet wheel 43, which distance is indicated by the clicks produced by the pawl 46 as the same passes the teeth of said ratchet wheel, and this operation positions the notch 44 in disc 40 immediately above the cross-bar 20 and in transverse alignment with the notches in discs 55 and 72. The operator now reengages knob 51 and reversely rotates sleeve 50 and when the notch 54 in disc 53 that is carried by the inner end of said sleeve, reaches a position directly above bar 20 and in transverse alignment with the notches in the discs 40, 55 and 72, the tension of spring 28 will move the locking bolt 19 and parts carried thereby upward, thus moving the bar 20 into the aligned notches and withdrawing the lower end of said locking bolt from position between the sliding plates P, thereby permitting the latter to be manipulated in the usual manner by actuation of the gear shift lever L. As the locking bolt is thus moved upward or into unlocked position, the wedge-shaped contact finger 23 moves into position between the inturned upper ends of the springs 24, thereby closing the ignition circuit; consequently enabling the motor of the vehicle to be started and operated.

It will be understood that when the combination is manipulated, as just described to unlock the parts of the locking mechanism, the spiral springs associated with the three discs are partially wound, thereby storing tension therein, and which tension is utilized for restoring the discs and the parts connected thereto, to their normal positions when the pawls that engage the ratchet wheels on said discs are released. It will also be understood that the combination may be manipulated in any sequence, i. e., any one of the three knobs may be manipulated, first, second or third, for the operation of each knob and the parts associated therewith is entirely independent of the operation of the other knobs and their parts, it only being necessary to operate each knob the proper distance or proper number of teeth of the corresponding ratchet wheel to bring the notches in the four discs into transverse alignment so as to receive bar 20 when the same is moved upward under the influence of spring 28.

Disc 53 which is fixed on the inner end of sleeve 50 functions as a tumbler, for it must be rotated so as to bring its notch into alignment with the notches in the other discs after disc 55 has been moved into position to bring its notch into alignment with the notches in the discs 40 and 72, and which disc 55 is actuated from the sleeve 50 thru the engagement of the key or lug 64 with lug 63.

When the car owner or authorized driver desires to lock the car, gear shift lever L is shifted into neutral position, thereby positioning plates P so that the notches 14 are in registration with each other, and with the hand or foot, the cap 34 on the upper end of rod 31 is engaged and forced downward against the resistance offered by spring 28 and after said rod is thus moved downward, pin 82 that projects from the side of said rod bears on the finger 81 that is fixed to and projects rearwardly from shaft 45, thereby slightly rotating said shaft, and the pins or screws 80 that pass thru the slots 79 in the hubs of the pawls 46, 59 and 76 will simultaneously actuate said pawls so as to disengage the points thereof from the teeth of the respective ratchet wheels, and the latter will, under the influence of the spiral springs that are associated with the discs, immediately reversely rotate said discs and the ratchet wheels carried thereby until the pins or screws 42, 57 and 74 reengage against the transverse rod 75, and thus the notches in the respective discs are positioned so that they are out of alignment with each other and out of registration with the bar 20.

When downward pressure on the rod 31 is relieved, spring 28 will move locking bolt 19 upward until the upper edge of bar 20 engages against the peripheries of the discs 40, 55 and 72, and thus the locking bolt with its lower end positioned in the notches 14 in the sliding plates P, will be prevented from moving upward until the combination of the lock is subsequently manipulated to align the notches in the discs and permit said bolt to move upward, as hereinbefore described.

As hereinbefore stated, I prefer to make the housing 10—a of manganese steel or iron, and in order to effectually resist attempts to break the lock thru the use of tools, such as cold chisels, hacksaws, pliers and the like, I prefer to make the discs 36, the cap 34, for the rod 31, and the knobs, from hard, tough metal such as manganese or metal that has been case hardened.

The various parts of the lock are assembled within the block or housing 10—a, thereby making it practically impossible to remove the lock while the same is in locking position. Even tho the knobs and projecting portions of the sleeves 39 and 50 and the shaft 67 are broken or cut off, the internal parts of the locking mechanism are still inaccessible.

There is practically little, if any, wear on the operating parts of the lock, and therefore, the necessity for lubrication is eliminated.

While I have shown and described my improved lock as being designed for use in connection with the transmission mechanism of a motor vehicle, said lock may, without material change, be advantageously employed for locking the steering wheel or steering column of a motor vehicle, or for locking any structure that requires a relatively simple and efficient theft-proof lock.

It will be understood that minor changes in the size, form and construction of the various parts of my improved combination locking mechanism may be made and substituted for those herein shown and described without departing from the spirit of my invention, the scope of which is set forth in the appended claims.

I claim as my invention:

1. In a combination lock, a spring pressed locking bolt, a plurality of coaxial discs, each provided in its outer edge with a notch that is adapted to receive a part of the locking bolt, manually engageable means for actuating said discs to bring the notches therein into alignment with each other, releasable means for holding the discs against reverse rotary movement after the same have been moved to bring the notches into alignment, and a plunger connected to said locking bolt for moving the same out of engagement with the notches in said discs.

2. In a combination lock, a spring pressed locking bolt, a plurality of coaxial discs, each provided in its outer edge with a notch that is adapted to receive a part of the locking bolt, manually engageable means for actuating said discs to bring the notches therein into alignment with each other, releasable means for holding the discs against reverse rotary movement after the same have been moved to bring the notches into alignment, a plunger connected to said locking bolt for moving the same out of engagement with the notches in said discs, and means for simultaneously releasing the disc restraining means.

3. In a combination lock, a locking bolt, a plurality of coaxial discs provided in their edges with notches adapted to receive a part of the locking bolt while the same is in unlocked position, a shaft carrying one of said discs, independently operable coaxial sleeves carrying the other discs, and a second notched disc carried by one of said sleeves and cooperating with the disc carried thereby in retaining the locking bolt in both locked and unlocked positions.

4. In a combination lock, a locking bolt, a plurality of coaxial discs provided in their edges with notches adapted to receive a part of the locking bolt while the same is in unlocked position, a shaft carrying one of said discs, independently operable coaxial sleeves carrying the other discs, a second notched disc carried by one of said sleeves and cooperating with the disc carried thereby in retaining the locking bolt in both locked and unlocked positions, a spring associated with said locking bolt and normally urging the same toward said discs, and a plunger for moving said locking bolt away from said discs.

5. In a combination lock, a housing, a frame within said housing, a locking bolt arranged for movement within said frame, a portion of which bolt projects thru the wall of the housing, a plurality of coaxial discs arranged within the same and provided in their edges with notches that are adapted when aligned with each other to receive a part of the locking bolt, manually engageable, coaxial members arranged for independent rotation and extending thru the wall of the housing and said frame for actuating said discs, a plate removably seated in the housing above said frame and a plunger connected to said locking bolt and extending upwardly thru said plate.

6. In a combination lock, a locking bolt, a plurality of independently operable coaxial discs provided in their edges with notches adapted when aligned with each other to receive a part of the locking bolt, a housing enclosing said discs, said locking bolt operating thru an opening in said housing, a plunger connected to said bolt for moving the same away from said discs, and a cap mounted for rotary movement on the end of said plunger.

In testimony whereof I affix my signature.

HAROLD B. PALMER.